Figure 1:
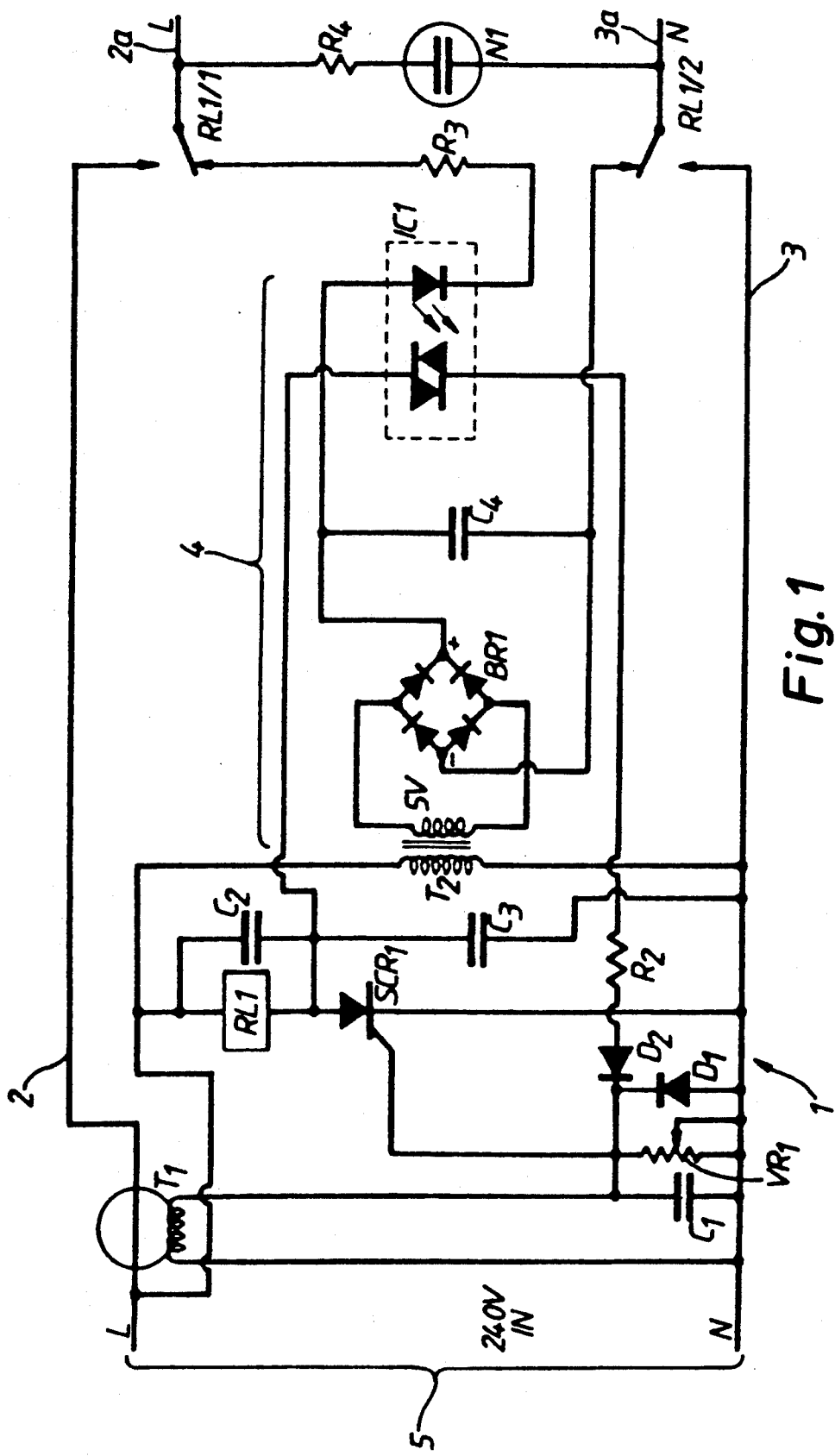

United States Patent [19]
Knights

[11] Patent Number: 5,151,841
[45] Date of Patent: Sep. 29, 1992

[54] ELECTRICAL SAFETY APPARATUS

[75] Inventor: Douglas S. Knights, Sawbridgeworth, United Kingdom

[73] Assignee: B & R Electrical PLC, Harlow, England

[21] Appl. No.: 458,613

[22] PCT Filed: May 22, 1989

[86] PCT No.: PCT/GB89/00560
§ 371 Date: Mar. 21, 1990
§ 102(e) Date: Mar. 21, 1990

[87] PCT Pub. No.: WO89/11747
PCT Pub. Date: Nov. 30, 1989

[30] Foreign Application Priority Data
May 23, 1988 [GB] United Kingdom ............... 8812151

[51] Int. Cl.[5] .................... H02H 3/18; H02H 3/26; H02H 3/42
[52] U.S. Cl. .................................................. 361/86
[58] Field of Search .................. 361/86, 58, 1, 49; 307/326, 327

[56] References Cited
U.S. PATENT DOCUMENTS
2,789,255  4/1957  Mekler .................................. 361/49
4,523,248  6/1985  Schmale et al. ...................... 361/1
4,630,161  12/1986  Seitz ...................................... 361/86

FOREIGN PATENT DOCUMENTS
0096915  12/1983  European Pat. Off.
3343270  6/1985  Fed. Rep. of Germany.
86/02500  4/1986  PCT Int'l Appl.

Primary Examiner—R. Skudy
Assistant Examiner—E. To
Attorney, Agent, or Firm—Watson, Cole, Grindle & Watson

[57] ABSTRACT

An electrical safety apparatus arranged to be connected between an electrical power source and a load to provide protection against electric shock due to, for example, the insertion of probes or needles into a potentially live socket by a child, and against shock form exposed conductors (e.g. the severed cable of an electrical appliance) connected to the power source. When the apparatus is connected to an electrical power source and then connected to a load, the apparatus first applies a low test voltage or test current to determine that the impedance of the load is within a safe range which excludes that of the human body, before connecting the load to the normal electrical power supply or mains. After the apparatus has been connected to a load of suitable impedance the apparatus monitors the power drawn by the load so that should the impedance of the load change to an unsafe value during operation of an electrical appliance (e.g. due to the power lead to the appliance being severed) the apparatus operates to disconnect the load from the electrical power source.

26 Claims, 2 Drawing Sheets

ELECTRICAL SAFETY APPARATUS

The present invention relates to an electrical safety apparatus, and particularly, but not exclusively, to apparatus for protecting against electric shock which may occur due to contact with electrical conductors connected to a power source.

It is known to provide earth leakage circuit breakers (elcb's) arranged to disconnect electrical conductors from a power source in response to the detection of a leakage current to earth. This prevents electrical shock to a user who, for example, accidently comes into contact with the live conductor of a cable connected to a mains electrical power supply.

However, elcb's do not provide protection in the case where there is no current to earth. For example, if a user comes into contact with both the live and neutral conductors of a cable connected to a mains power supply there may be no current to earth, and the elcb will provide no guard against shock to the user.

The electrical characteristics of the human body are generally different to the characteristics of standard electric appliances, such as for example, lawn mowers which need to be driven by a domestic mains power supply. For example, the IEC publication 479-1 chapter 1, states that the impedance of the human body varies with touch voltage, and gives a table of body impedance for values of touch voltage from which it can be seen that at 25V or below the minimum expected impedance for 95% of the population would be 1750 ohms and is generally much higher. On the other hand, domestic electrical appliances are likely to have an impedance at this range of voltage of less than 600 ohms.

In the case where a circuit breaker employs a relay to connect and disconnect an electrical power source and a load (appliance), it is necessary for the relay to operate each time the appliance in use is switched on and consequently must withstand accidental short circuit conditions when energised. The relay must have minimal contact bounce and must not be subject to momentary contact opening and closing due to heavy short circuit currents causing the contact blades to move and open their contact points, leading to the possibility of contact welding. It is therefore important for circuit breakers to have adequate short circuit protection.

A power supply system comprising an a.c. voltage supply source, a load and a connecting cable between the source and the load is disclosed in European Patent 096915. One feature of the system is the use of a parallel arrangement of at least one capacitor and a direct current (d.c.) source placed in a d.c. circuit comprising the two cable conductors of the connecting cable. When the connecting cable is disconnected from the load (open circuit) the voltage across the capacitor increases — when a threshold circuit determines that a threshold voltage has been reached it causes the a.c. voltage supply source to be disconnected from the connecting cable. In a second feature if, after the connecting cable has been disconnected from the load, a load of low impedance (short circuit) is connected (accidentally) across the cable conductors, there is provided a system for preventing the full a.c. voltage supply (700V) being connected to the connecting cable: the power source attempts to power up to a voltage of 30V a.c. If the impedance of the load is high, the voltage across the output exceeds a 20V threshold value and a long as the direct current path across the capacitor referred to in the description of the first feature is closed then the full voltage supply (700) is applied to the load. If the 20V threshold voltage is not exceeded due to the presence of a short circuit or load of very low impedance, then the power source does not supply the full (700V) voltage to the output.

The present invention provides electrical safety apparatus arranged to be connected between an electrical power source and a load, said apparatus comprising means operative before the normal electric power supply is applied to the load to apply a test voltage or current to the load, and means arranged to prevent the application of the normal electric power supply if the load responds to the test current or voltage in such a way as would be expected of the human body.

Preferably, the apparatus is configured such that whether or not the normal electric power supply is applied depends on an impedance characteristic of the load.

In a preferred embodiment, the apparatus is responsive to a predetermined threshold level of impedance for the load in determining whether or not to apply the normal electric power supply to the load. For example, considering a domestic mains power supply in the UK, the threshold may be set to 600 ohms impedance for the load, so that the normal electric power supply will only be applied if the load impedance to the test voltage or current is below 600 ohms. Any human coming into contact with conductors connected to the power source via the safety apparatus will not cause the normal electric power supply to be applied, as the apparatus will be arranged such that the impedance of the human body to the test voltage or current will be above the 600 threshold level.

Preferably, the apparatus is arranged such that, when it is connected to the power source, the test voltage or current is available at connection terminals to which a load may be connected.

Preferably, a test voltage is applied to the load and the apparatus comprises circuitry responsive to a predetermined current threshold level of the current drawn by the load in determining whether or not to apply the normal electric power supply to the load.

Preferably, means are provided which are operative after the normal electric power supply has been applied to the load to monitor the electrical power taken by the load, and to remove the normal electric supply from the load if a threshold level is crossed.

The present invention further provides safety apparatus arranged to be connected between an electrical power source and a load, said apparatus comprising means operative before the normal electric supply is applied to the load to apply a test voltage thereto, and means responsive to a current threshold level of current taken by the load under the test voltage, to determine whether or not to apply the normal electric power supply to the load.

The current threshold level is preferably arranged such that the normal electric supply is only applied if the load takes the amount of current expected of the type of loads being used with the particular power supply. For example, where the power source is domestic mains the current threshold will be set for domestic appliances such as lawn mowers, etc.

An advantage of the present invention is that it can provide protection against shock occurring by contact with live and neutral conductors connected to a power source, as the test voltage or current may be applied to live and neutral conductors.

The apparatus can advantageously be incorporated at a connection point with the electrical power source. For example, the apparatus could be incorporated in a domestic mains socket. This would provide protection against shock to, for example, the insertion of probes or needles into a potentially live socket by a child, as well as protection against shock from exposed conductors (e.g. a severed cable) connected to the power source.

Figure 2:
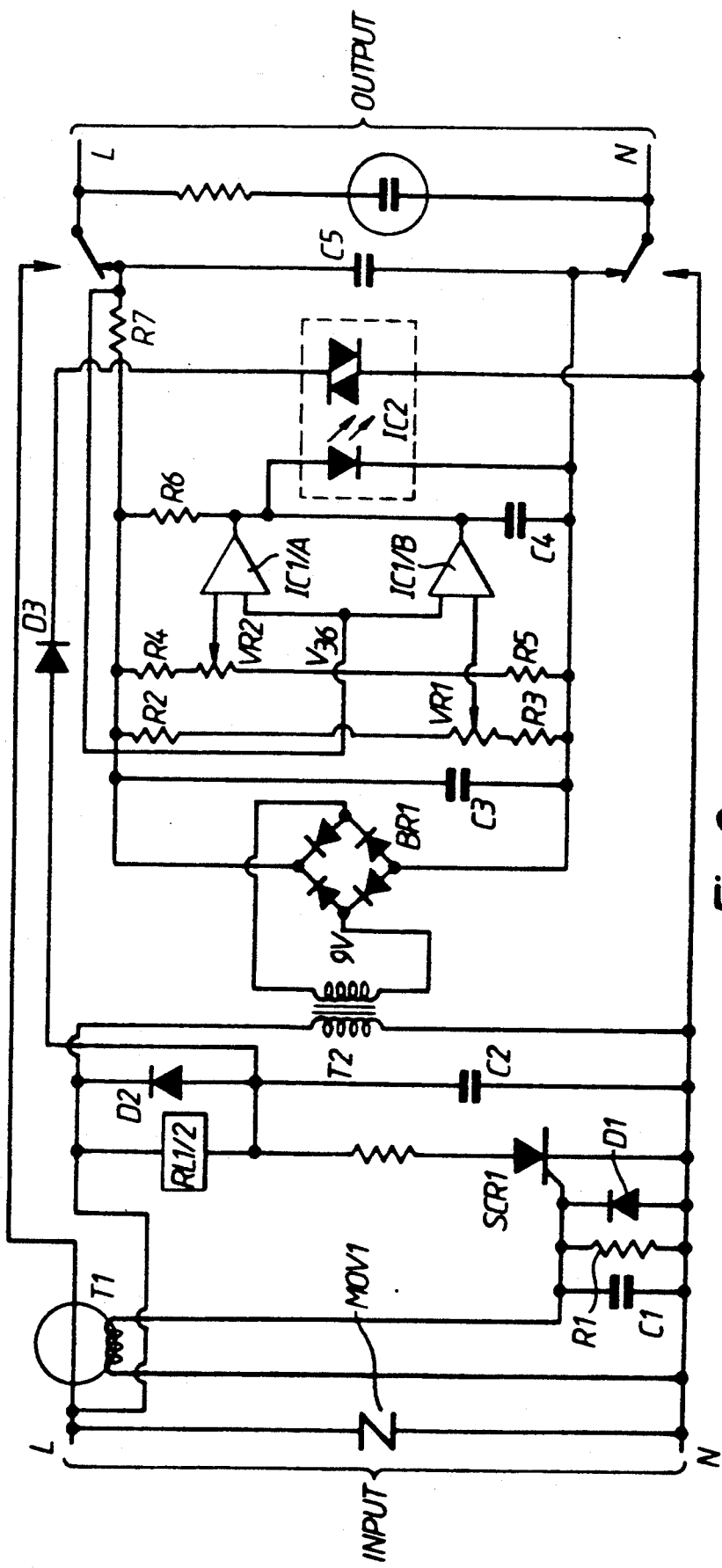

Features and advantages of the present invention will become clear from the following description of embodiments thereof, by way of example only, with reference to the accompanying drawings, in which FIG. 2 shows a circuit diagram of apparatus in accordance with a first embodiment of the present invention; and FIG. 2 shows a circuit diagram of apparatus in accordance with a second embodiment of the present invention.

With reference to FIG. 1, reference numeral 1 generally designates apparatus in accordance with the first embodiment of the present invention, which may, for example, be incorporated in a domestic power supply socket. Conductors 2, 3 are connected to live L and neutral N terminals of the power supply. Further conductors 2a, 3a, provide connection terminals for a load to be connected to the power source via the apparatus 1. Relay RL1 controls relay terminals RL1/1, RL1/2, which control connection of conductors 2a, 3a to conductors 2, 3 and the power supply.

Prior to connection of a load, conductors 2a, 3a, are connected to a circuit generally designated by reference numeral 4, which applies a test voltage to the conductors. The circuit 4 is set to be responsive to a current threshold value of the current taken by the load under the test voltage to actuate the relay RL1 to close the contacts RL1/1, RL1/2, to connect conductors 2a, 3a to conductors 2, 3 and the power source.

Further circuitry, generally designed by reference numeral 5, monitors the current taken from the power source by the load and is responsive to a current threshold level to disconnect conductors 2a, 3a from conductors 2, 3, via relay RL1.

In more detail, using a domestic mains supply (UK 240v, 50Hz) as an example of the power source, the 240v input to the socket, plug or adaptor housing the apparatus 1, is applied to the transformer T2 which has a 5 volt output, which is rectified and smoothed by the full wave rectifier BR1 and capacitor C4. The positive rail of this supply is fed to the transmitter of an opto-isolator IC1 and then via R3 and contact RL1/1 to the live output of the socket, plug or adaptor. The negative rail of the 5 volt supply is fed via RL1/2 to the neutral output of the socket, plug or adaptor.

The opto-isolator IC1 is designed, in conjunction with resistor R3 to respond to loads having an impedance of 600 ohms or less, thus the transmitter section of the opto-isolator IC1 will not respond to impedances higher than 600 ohms, which by reference to the IEC publication 479-1 chapter 1, it can be seen means that it will not respond to contact by the human body even if contact is made by firmly grasping electrodes between live and neutral with the shortest possible path by the human body in circuit.

When a load having an impedance of 600 ohms or less is connected between the live and neutral output terminals, the transmitting section of IC1 will conduct and cause its triac section to conduct.

This in turn will turn on SCR1 every half cycle via R2 and D2. When conducting SCR1 will energise relay RL1 which will remain energised during the nonconducting half cycle by virtue of capacitor C2.

Relay RL1 energises and causes contacts RL1/1 and RL/2 to changeover, removing the 5 volt supply from the output socket and connecting the electrical power supply (e.g. 240V) in its place allowing the appliance to operate.

When the contacts of relay RL1 changeover the triac of IC1 ceases to conduct and removes the gate trigger voltage from SCR1 this is replaced by the output of T1 which is a current transformer and provided with an output winding adjusted by the variable resistor VR1 in conjunction with C1.D1 to respond to a threshold level in the power dissipated by the load (for the UK this would be 96 watts or more) which corresponds to an impedance of 600 ohms or less at the electrical supply L voltage (for the UK, 240 volts, 50Hz). The live input passes through the current transformer T1 to the line output via contact RL1/1 and monitors the current drawn by the load, thus producing the required output in the output winding.

Capacitor C2 also ensures that relay RL1 remains energised during the transit time of contacts RL1/1 and RL1/2.

It can be seen that in the case of the socket supplying a portable appliance such as a lawn mower and its supply cable being severed, the load current will cease and relay RL1/2 will revert to its de-energised position, its contacts reconnecting the 5v supply.

Protection against shock from the electrical power supply (e.g. 240V) is thus advantageously provided in the following case.

1. In the case of the socket output being exposed either by a broken plug or the insertion of metal object into the socket, provided an additional load which exceeds the threshold power level (e.g. 96 watts) is not also being drawn at the same time.

2. In the case of live, or neutral or both conductors being severed.

3. In the case of an appliance being switched off but not isolated before exposing live conductors or parts.

4. In the case of the conductors being exposed but not severed provided the appliance is switched off protection is again provided.

The neon N in FIG. 1 warns when the electrical power supply (e.g. 240V) is present at the socket.

A flag indicator could also be mechanically fitted to relay RL1 to indicate when its contacts where in the position where the electrical power supply (e.g. 240V) is connected.

It can be seen that each time a load (electrical appliance) is disconnected from the safety apparatus (or electrical socket incorporating the apparatus) the impedance "seen" by the output terminals of the apparatus exceeds the threshold of 600 ohms so the relay RL1 will revert to its de-energised position and, the 5V supply will be reconnected to the output terminals of the apparatus. The relay is likewise de-energised if power is switched off at the electrical socket. This ensures that the 5V supply always appears at the output of the apparatus each time that a new appliance is connected/-plugged-in, and in the event that the impedance of the load changes while the electrical power is switched off at the electrical socket.

Further protection against shock may be provided by utilising an earth leakage circuit breaker in conjunction with apparatus in accordance with the first embodiment of the present invention.

In a second embodiment of the present invention the apparatus, in addition to protecting against connection to a human body, further provides protection against short circuit of the output terminals of the apparatus.

To enable an unsophisticated relay to be used, the second embodiment prevents energisation of the relay to connect the electrical power source to the load when the load presented has a d.c. resistance of less than 2 ohms and greater than 600 ohm, thereby reducing the short circuit current which can flow through the contacts of the relay to less than 120 Amps at a mains supply voltage of 240V a.c. This amperage is within the operating capacity of most power relays conventionally used in electrical safety and protection circuit applications. The circuitry to the left of and including capacitor C4 in FIG. 1 and the function of this part of the circuit is the same in the second embodiment.

A first variable resistor acts as a potentionmeter from which a pre-determined voltage is applied to a first input of a voltage comparator. Likewise a second variable resistor taps a predetermined voltage which is applied to a second input of the voltage comparator. The values of the voltages set by the first variable resistor and the second variable resistor correspond to the value of a resistor multiplied by the maximum current (Imax) and by the minimum current (Imin) which flows through the resistor. The current Imax is equal to that which would flow in a load having a impedance of 2 ohms when a voltage equal to that of the electrical power source (e.g. 240 V a.c. for the UK) is applied to it. Similarly, the current Imin is equal to that which would flow in a load having a impedance of 600 ohms when a voltage equal to that of the electrical power source is applied to it, so for a 240V supply, Imin=40-0mA and Imax=120A.

In the second embodiment the voltage comparator is arranged such that on connection of a load between the Live and Neutral conductors of the output, a current flows through the load and through the resistor causing a voltage to develop in the voltage comparator.

If the voltage comparator lies between the values of voltage set by the first and second voltage resistors then the voltage comparator which is normally in an ON state, will turn OFF allowing current to flow through an opto-islolator. Consequently, current will flow and energise the relay as described with reference to the first embodiment of the invention.

It can be seen that if the load impedance is less than two ohms or greater than 600 ohms then the voltage comparator will not turn OFF so that the opto-isolator will not turn on its triac and the relay will not energise. Therefore the electrical power source will not be connected to a load having an impedance of less than 2 ohms (including a short circuit), or greater than 600 ohms (such as a human body) appearing at the Live and Neutral terminals of the output.

Once the electrical power source has been connected to a suitable load, a low d.c. voltage is derived from a transformer to maintain energisation of relay (to connect the electrical power source to the load) in a similar manner to the first embodiment of the invention.

If the impedance of the load (Z Load) changes during operation of the load (appliance) to a value which is outside the range 2 ohms <Z Load <600 ohms, then the voltage comparator is switched ON, thereby turning the opto-isolator OFF and consequently de-energising the relay to disconnect the load from the electrical power source.

The apparatus according to two embodiments of the invention has been described specifically in relation to a two conductor (live and neutral) situation. Three or more conductors could be used with the present invention.

Rather than connecting or disconnecting a power source to output terminals, as has been described in relation to the specific embodiments, the present invention could be act to adjust electrical power supplied by a variable power supply, depending on the response of the load to the test voltage or current.

The "normal" electric power supply, refers to the standard supply used with loads generally connected to the particular power point concerned. For example for the UK this would be 240v, 50Hz.

The specific embodiments of the present invention have been described which use a 240V power source and test voltages of 5V and 9V. Other power source voltages and test voltages may be used.

I claim:

1. An electrical safety apparatus for connection between an electrical power source and a load, comprising:

controllable connection means transferable between a first condition, in which the electrical power source is connected to the load, and a second condition, and including a switching means having one pole connected to each terminal of the load for switching connections to the terminals, the switching means having associated with each pole, a plurality of positions, including a first position, corresponding to said first condition, and a second position, corresponding to said second condition;

means for applying a low voltage, which is less than the voltage of electrical power source, to the load when said connection means is in the second condition;

monitoring means for monitoring a load impedance and for preventing the connection means from being transferred to or existing in said first condition when said impedance is indicative of the presence of a human being;

activation means responsive to the monitoring means, for controlling said means; and said monitoring means including sensing means for directly sensing the current drawn by the load when said low voltage is applied thereto, and means for indicating the presence of a human being when the current sensed by the sensing means lies below a predetermined threshold value.

2. An apparatus according to claim 1, wherein said predetermined threshold value of the current corresponds to a predetermined threshold impedance value which is substantially less that the impedance of the human being.

3. The electrical safety apparatus according to claim 1, wherein the activation means includes means coupled to the sensing means for causing the activation means to activate the connection means when the current sensed by the sensing means indicates the absence of a human being.

4. The electrical safety apparatus according to claim 1, wherein activation of the connection means causes the connection means to transfer from the second condition to the first condition.

5. The electrical safety apparatus according to claim 1, wherein:
the connection means is in said second condition after the apparatus is connected to the electrical power source, and before the apparatus is connected to the load.

6. An apparatus according to claim 1 wherein the monitoring means includes:
power monitor means in co-operation with the activation means, for monitoring the power supplied to the load when the electrical power source is connected to the load.

7. The electrical safety apparatus according to claim 6, wherein the power monitoring means includes power threshold detection means, operable when the electrical power source is connected to the load, for causing the activation means to de-activate the connection means when the power monitor means determines that the power supplied to the load has dropped below a pre-determined power threshold level fixed by the power threshold detection means.

8. The electrical safety apparatus according to claim 7, wherein the power monitor means includes power threshold detection means for fixing said predetermined power threshold level and detecting crossings thereof.

9. The electrical safety apparatus according to claim 8, wherein de-activation of said connection means causes the connection means to transfer from said first condition to said second condition.

10. The electrical safety apparatus according to claim 2, wherein: the pre-determined threshold impedance value is 600 ohms or less.

11. The electrical safety apparatus according to claim 1, wherein: the predetermined current threshold level is greater than or equal to the current which would flow in an impedance of 600 ohms when a voltage equal to that of said low voltage is applied thereto.

12. The electrical safety apparatus according to claim 7, wherein the pre-determined power threshold value is less than or equal to the power which would be drawn by an impedance of 600 ohms when a voltage equal to that of said electrical power source is applied thereto.

13. The electrical safety apparatus according to claim 12, wherein the monitoring means includes comparator means arranged to be coupled to the load when the connection means is in said second condition.

14. The electrical safety apparatus according to claim 13, wherein the apparatus further comprises:
first preset means for supplying a first pre-determined limiting value to the comparator means,
second preset means for supplying a second pre-determined limiting value to the comparator means;
indicator means connected to the terminals of the load and in cooperation with the comparator means for supplying an indicator value of the comparator means;
said first and second predetermined limiting values corresponding to an upper and lower limits of a predetermined range.

15. The electrical safety apparatus according to claim 14, wherein the monitoring means includes means coupled to the comparator means and to the connection means for causing the activation means to activate the connection means if and only if the comparator means determines that the indicator value lies between the first and second predetermined limiting value.

16. The electrical safety apparatus according to claim 15, wherein activation of the connection means causes the connection means to transfer from the second condition to the first condition.

17. The electrical safety apparatus according to claim 14, wherein: the first and second pre-determined limiting values, and the indicator value, are electrical currents.

18. The electrical safety apparatus according to claim 18, wherein the first pre-determined limiting value is a current equal to that which would flow in an impedance of about 600 ohms when a voltage equal to that of a low voltage is applied thereto; and
the second pre-determined limiting value is a current equal to that which would flow in an impedance of about two ohms when a voltage equal to that of a low voltage is applied thereto.

19. The electrical safety apparatus according to claim 14, wherein:
the indicator means comprises a resistor; and
the first and second pre-determined limiting values, and the indicator value, are voltages.

20. The electrical safety apparatus according to claim 19, wherein the first pre-determined limiting value is a voltage equal to that developed across the indicator means when a current flows therein which has a value equal to the voltage of the low voltage divided by 600 ohms; and
the second pre-determined limiting value is a voltage equal to that developed across the indicator means when a current flows therein which has a value equal to the voltage of the low voltage divided by 2 ohms.

21. The electrical safety apparatus according to claim 14 wherein the first preset means and the second preset means comprise a voltage divider.

22. The electrical safety apparatus according to claim 14 wherein the comparator means comprises an integrated circuit.

23. The electrical safety apparatus according to claim 6, wherein the power monitor means includes a current transformer.

24. The electrical safety apparatus according to claim 7, wherein the power threshold detection means includes a capacitor connected in parallel with a variable resistor and with a diode.

25. The electrical safety apparatus according to claim 6, wherein the switching means comprises a relay.

26. The electrical safety apparatus according to claim 1, wherein the electrical power source comprises a domestic mains supply.

* * * * *